United States Patent
Ajaru et al.

(10) Patent No.: US 12,028,566 B2
(45) Date of Patent: Jul. 2, 2024

(54) SYSTEM, METHOD AND COMPUTER-READABLE MEDIUM FOR CATEGORIZING LIVE STREAMING DATA

(71) Applicant: 17LIVE Japan Inc., Tokyo (JP)

(72) Inventors: Hemanth Kumar Ajaru, Tokyo (JP); Kshitiz Yadav, Tokyo (JP); Durgesh Kumar, Tokyo (JP); Hardik Taneja, Tokyo (JP); Shih Bo Lin, Tokyo (JP)

(73) Assignee: 17LIVE Japan Inc., Tokyo (JP)

( * ) Notice: Subject to any disclaimer, the term of this patent is extended or adjusted under 35 U.S.C. 154(b) by 33 days.

(21) Appl. No.: 18/074,065

(22) Filed: Dec. 2, 2022

(65) Prior Publication Data
US 2023/0291947 A1 Sep. 14, 2023

(30) Foreign Application Priority Data
Mar. 8, 2022 (JP) ................. 2022-034882

(51) Int. Cl.
*H04N 21/25* (2011.01)
*H04N 21/2187* (2011.01)
*H04N 21/234* (2011.01)

(52) U.S. Cl.
CPC ....... *H04N 21/251* (2013.01); *H04N 21/2187* (2013.01); *H04N 21/23418* (2013.01)

(58) Field of Classification Search
CPC .............. H04N 21/251; H04N 21/2187; H04N 21/23418
See application file for complete search history.

(56) References Cited

U.S. PATENT DOCUMENTS

| 11,395,033 B2 * | 7/2022 | Kunkel | H04N 21/4728 |
| 2015/0082330 A1 * | 3/2015 | Yun | H04N 21/44218 |
| | | | 725/18 |

FOREIGN PATENT DOCUMENTS

| CN | 101937445 A | 1/2011 | |
| FR | 3012711 A1 * | 5/2015 | H04N 7/173 |

OTHER PUBLICATIONS

Notification of Reasons for Refusal dated Aug. 30, 2020, issued in corresponding Japanese Patent Application No. 2022-034882 with English translation (8 pgs.).

* cited by examiner

*Primary Examiner* — Sumaiya A Chowdhury
(74) *Attorney, Agent, or Firm* — Pillsbury Winthrop Shaw Pittman, LLP

(57) ABSTRACT

The present disclosure relates to a system, a method and a computer-readable medium for tagging live streaming data. The method includes generating a first intermediate tag for the live streaming program, generating a second intermediate tag for the live streaming program, and determining a final tag for the live streaming program according to the first intermediate tag and the second intermediate tag. The present disclosure can categorize contents in a more granular and precise way.

7 Claims, 10 Drawing Sheets

| Live streaming data: streamer singing and playing guitar |  | Model | Output sequence (intermediate tags) | Final score for each candidate tag | | |
|---|---|---|---|---|---|---|
| | | | | Guitar & singing | Dancing & singing | Pure chatting |
| | | Object | [Guitar, Microphone, ...] | 5+4+5+4+4 =22 | 1+4+1+4+1 =11 | 0+5+0+2+0 =7 |
| | | Music | [Guitar sound, karaoke, ...] | | | |
| | | Activity | [Playing guitar, ...] | | | |

Final tag: Guitar & singing

| Machine learning model | Stream ID | Generated intermediate tag sequence |
|---|---|---|
| MD1 (object) | LS1 | (xx:15:01, drink), (xx:15:31,guitar), (xx:16:01, guitar), (xx:16:31, guitar) ... |
| MD2 (music) | LS1 | (xx:15:11, karaoke), (xx:15:41, talking), (xx:16:11, karaoke), (xx:16:41, karaoke) ... |
| MD3 (activity) | LS1 | ... |

| Criterion ID | Arrangement of intermediate tags | Corresponding final tag |
|---|---|---|
| C1 | guitar x3<br>karaoke x 2 | guitar singing |
| C2 | ... | |
| C3 | ... | |

| Stream ID | Streamer ID | Viewer ID | Final tag |
|---|---|---|---|
| LS1 | MMN | CGB, ESD, ... | guitar singing |
| ... | ... | ... | ... |

FIG. 4   The final tag is determined to be "guitar singing"

| Model | Intermediate tag | Candidate tag | | |
|---|---|---|---|---|
| | | Guitar & singing | Dancing & singing | Pure chatting |
| Object | Guitar | 5 | 1 | 0 |
| | Microphone | 4 | 4 | 5 |
| | ... | ... | ... | ... |
| Music | Guitar sound | 5 | 1 | 0 |
| | Karaoke | 4 | 4 | 2 |
| | ... | ... | ... | ... |
| Activity | Playing guitar | 4 | 1 | 0 |
| | Dancing | 0 | 5 | 0 |
| | ... | ... | ... | ... |

Contribution score table 210

FIG. 6

SYSTEM, METHOD AND COMPUTER-READABLE MEDIUM FOR CATEGORIZING LIVE STREAMING DATA

CROSS-REFERENCE TO RELATED APPLICATIONS

This application is based on and claims the benefit of priority from Japanese Patent Application Serial No. 2022-034882 (filed on Mar. 8, 2022), the contents of which are hereby incorporated by reference in its entirety.

TECHNICAL FIELD

The present disclosure relates to categorizing streaming data and, more particularly, to categorizing live streaming data.

BACKGROUND

Real time data on the Internet, such as live streaming programs, has become popular in our daily life. There are various platforms or providers providing the service of real time data accessing, and the competition is fierce. Therefore, it is important for a content provider to efficiently, precisely, and vibrantly recommend its users or viewers their desirable contents such that the viewers can stay on the platform as long as possible. One critical feature in a recommendation system is categorization of the contents, which determines the precision or efficiency of recommending the right content to a specific viewer.

SUMMARY

A method according to one embodiment of the present disclosure is a method for tagging a live streaming program being executed by one or a plurality of computers, and includes: generating a first intermediate tag for the live streaming program, generating a second intermediate tag for the live streaming program, and determining a final tag for the live streaming program according to the first intermediate tag and the second intermediate tag.

A system according to one embodiment of the present disclosure is a system for tagging a live streaming program that includes one or a plurality of processors, and the one or plurality of computer processors execute a machine-readable instruction to perform: generating a first intermediate tag for the live streaming program, generating a second intermediate tag for the live streaming program, and determining a final tag for the live streaming program according to the first intermediate tag and the second intermediate tag.

A computer-readable medium according to one embodiment of the present disclosure is a non-transitory computer-readable medium including a program for tagging a live streaming program, and the program causes one or a plurality of computers to execute: generating a first intermediate tag for the live streaming program, generating a second intermediate tag for the live streaming program, and determining a final tag for the live streaming program according to the first intermediate tag and the second intermediate tag.

BRIEF DESCRIPTION OF THE DRAWINGS

FIG. 2B shows an exemplary data structure of the generated intermediate tag table 206 of FIG. 2A.

FIG. 2C shows an exemplary data structure of the criterion database 208 of FIG. 2A.

FIG. 2D shows an exemplary data structure of the stream database 207 of FIG. 2A.

FIG. 6 shows an exemplary data structure of the contribution score table 210 of FIG. 5.

DETAILED DESCRIPTION

Conventional methods or systems for categorizing or tagging live data on the internet depend on machine learning models to detect the type or categorization of the live data. For example, the live data is continuously input into a machine learning model, which will then deliver a category of the live data as an output. However, taking direct output of a machine learning model as the categorization result may face challenges that need to be addressed.

Alrighms of a machine learning model are designed for a machine to digest and recognize the digital content, therefore the direct output of the machine learning model tends to be more understable by the machine, and less understandable by humans. Furthermore, due to the inherent limitations involved in building the algorithms to be processed by a machine, the outputs of the machine learning models tend to have lower granularity and may not be precise enough in tagging the live contents for various purposes.

It is desirable to categorize live data in a human-understandable manner. Results of the categorization process of live data (such as tags of live streaming programs) are utilized for subsequent matching processes with users (such as viewers of live streaming programs). For example, tags of live streaming programs and tags of viewers are utilized to deliver a correlation, a likeability, or a similarity between each live streaming program and each user. Tags of users are usually human-understandable such that it is easier for a user to input/communicate his or her attributes, for example, in the cold start of experiencing the live streaming service. Therefore, human-understandable tags for live streaming programs are desirable for reaching precise and efficient matchings with viewers, which can lead to precise and efficient recommendations for those viewers.

Figure 1:
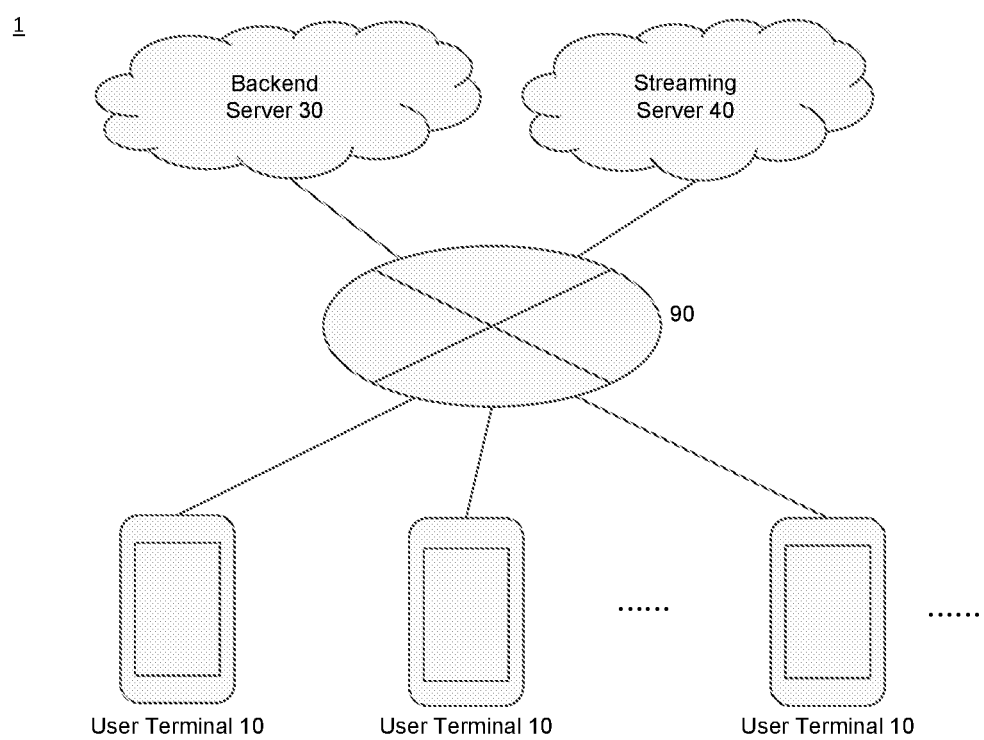
FIG. 1 shows a schematic configuration of a communication system according to some embodiments of the present disclosure.

FIG. 1 shows a schematic configuration of a communication system according to some embodiments of the present disclosure.

The communication system 1 may provide a live streaming service with interaction via a content. Here, the term "content" refers to a digital content that can be played on a computer device. In other words, the communication system 1 enables a user to participate in real-time interaction with other users on-line. The communication system 1 includes a plurality of user terminals 10, a backend server 30, and a streaming server 40. The user terminals 10, the backend server 30 and the streaming server 40 are connected via a network 90, which may be the Internet, for example. The backend server 30 may be a server for synchronizing interaction between the user terminals and/or the streaming server 40. In some embodiments, the backend server 30 may be referred to as the server of an application (APP) provider. The streaming server 40 is a server for handling or providing streaming data or video data. In some embodiments, the backend server 30 and the streaming server 40 may be independent servers. In some embodiments, the backend server 30 and the streaming server 40 may be integrated into one server. In some embodiments, the user terminals 10 are client devices for the live streaming service. In some embodiments, the user terminal 10 may be referred to as viewer, streamer, anchor, podcaster, audience, listener or the like. Each of the user terminal 10, the backend server 30, and the streaming server 40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

Figure 2A:
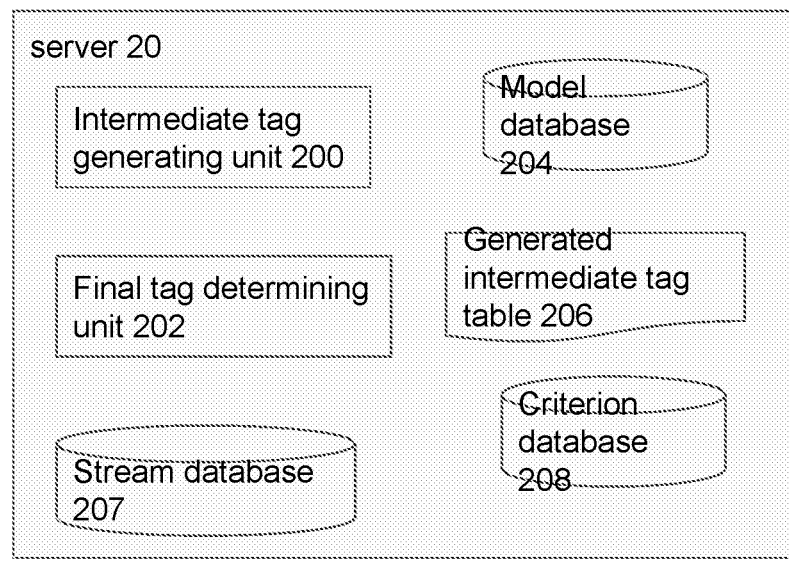
FIG. 2A shows an exemplary block diagram of a server in accordance with some embodiments of the present disclosure.

FIG. 2A shows an exemplary block diagram of a server in accordance with some embodiments of the present disclosure. The server 20 comprises an intermediate tag generating unit 200, a final tag determining unit 202, a model database 204, a generated intermediate tag table 206, a stream database 207, and a criteria database 208. In some embodiments, the server 20 may be a portion of or may be the backend server 30 or the streaming server 40 in FIG. 1. In some embodiments, anyone of the intermediate tag generating unit 200, the final tag determining unit 202, the model database 204, the generated intermediate tag table 206, and/or the criterion database 208 may be implemented on a backend server, a streaming server or a user terminal.

FIG. 2B shows an exemplary data structure of the generated intermediate tag table 206 of FIG. 2A. The tag table 206 associatively stores a machine learning model identification information (ex. model ID), a stream ID identifying a live streaming which video and audio data are being input to the machine learning model, and a sequence of generated intermediate tags outputted from the machine learning model. The intermediate tag is associated with a timestamp which indicates when the intermediate tag is generated.

FIG. 2C shows an exemplary data structure of the criterion database 208 of FIG. 2A. The criterion database 208 is configured to store criteria for determining final tags. Each criterion includes a specific limitation of arrangement or combination of intermediate tags, and corresponds to a final tag.

FIG. 2D shows an exemplary data structure of the stream database 207 of FIG. 2A. The stream database 207 associatively stores a stream ID identifying a live streaming available on a live streaming platform, a streamer ID identifying a streamer providing the live streaming, viewer ID(s) identifying viewer(s) who is (are) viewing the live streaming, and a final tag for the live streaming which is determined by the final tag determining unit 202.

Returning to FIG. 2A, in some embodiments, the intermediate tag generating unit 200 is configured to generate intermediate tags for a live streaming program. For example, the intermediate tag generating unit 200 may utilize a machine learning model stored in the model database 204 to generate intermediate tags for the live streaming program. In some embodiments, an intermediate tag is a direct output from a machine learning model. The generated intermediate tags are stored in the generated intermediate tag table 206. In some embodiments, the intermediate tag generating unit 200 may utilize multiple machine learning models to generate intermediate tags for a streaming program in a parallel manner.

In some embodiments, the final tag determining unit 202 is configured to determine the final tag for the live streaming program. For example, the final tag determining unit 202 may refer to the generated intermediate tag table 206 and the criterion database 208, to determine if any result of the generated intermediate tags meets any criterion in the criterion database 208.

In the embodiment shown in FIG. 2A, the model database 204 at least includes an object recognizing model MD1, a music recognizing model MD2, and an activity recognizing model MD3. The object recognizing model MD1 generates the sequence of tags [drink, guitar, guitar, guitar, . . . ] in order. The music recognizing model MD2 generates the sequence of tags [karaoke, talking, karaoke, karaoke] in order.

The criterion C1 includes the limitation of [guitar×3, karaoke×2], which indicates 3 times of generation of the tag "guitar" and 2 times of generation of the tag "karaoke." The criterion C1 corresponds to the final tag "guitar singing." Therefore, when a combination of [guitar×3, karaoke×2] is found in the generated intermediate tag table 206, the final tag determining unit 202 would determine the final tag to be "guitar singing."

The criteria may further include other limitations such as time limitation. For example, the criterion C1 may further require that the 3 "guitar" tags or the 2 "karaoke" tags have to be generated consecutively. For example, the criterion C1 may further require that the 3 "guitar" tags or the 2 "karaoke" tags have to be generated within a certain period of time.

Figure 3:
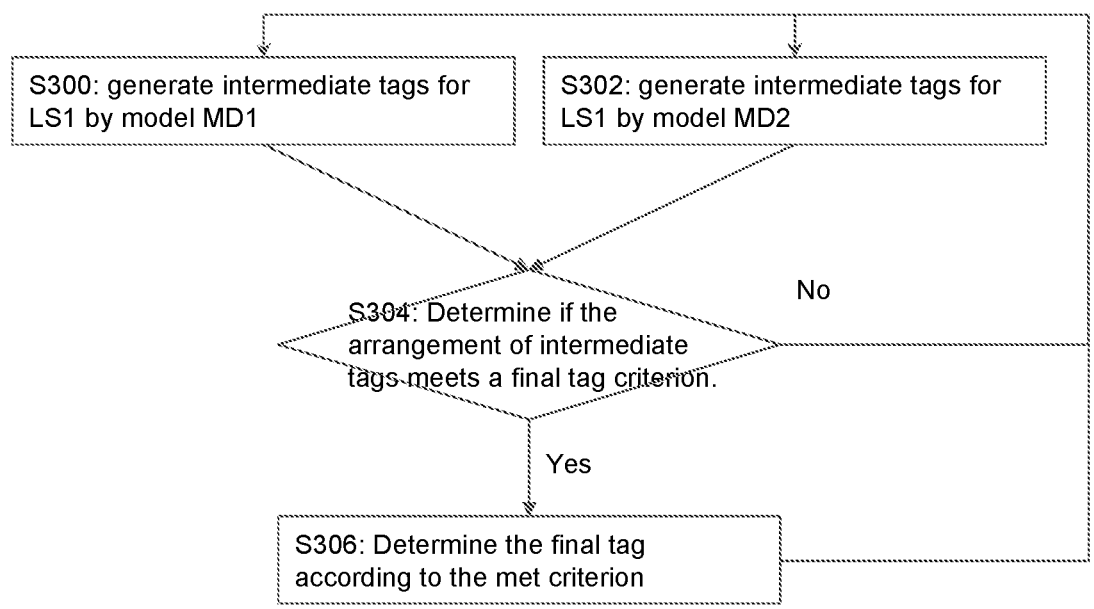
FIG. 3 shows an exemplary flow chart illustrating a method of categorization in accordance with some embodiments of the present disclosure.

FIG. 3 shows an exemplary flow chart illustrating a method of categorization in accordance with some embodiments of the present disclosure.

In step S300, the intermediate tag generating unit 200 generates intermediate tags for a live streaming program LS1 by model MD1 stored in the model database 204. The generated intermediate tags are recorded in the generated intermediate tag table 206.

In step S302, the intermediate tag generating unit 200 generates intermediate tags for the live streaming program LS1 by model MD2 stored in the model database 204. The generated intermediate tags are recorded in the generated intermediate tag table 206.

In step 304, the final tag determining unit 202 determines if the arrangement of intermediate tags (intermediate tags generated from the model MD1 and intermediate tags from the model MD2) meets a final tag criterion. The final tag determining unit 202 refers to the generated intermediate tag table 206 and the criterion database 208, and determine if any criterion in the criterion database 208 has been met by an arrangement of the intermediate tags recorded in the generated intermediate tag table 206. If Yes, the flow goes to step S306. If No, the flow goes back to step S300 and step S302 for continuous generation of intermediate tags.

For example, a criterion C1 (corresponding to the final tag "guitar singing") in the criterion database 208 may require an intermediate tag from model MD1 ("guitar") to be generated consecutively for 3 times and an intermediate tag from model MD2 ("karaoke") to be generated consecutively for 2 times. For that criterion to be met, the final tag determining unit 202 determines the intermediate tag from model MD1 ("guitar") to have been generated consecutively for 3 times, and determines the intermediate tag from model MD2 ("karaoke") to have been generated consecutively for 2 times.

In step S306, the final tag determining unit 202 determines the final tag according to the criterion met in step S304. The final tag corresponds to the met criterion in the criterion database 208. The final tag determining unit 202 stores the determined final tag in the stream database 207. The flow then goes back to step S300 and step S302 for continuous generation of intermediate tags.

Figure 4:
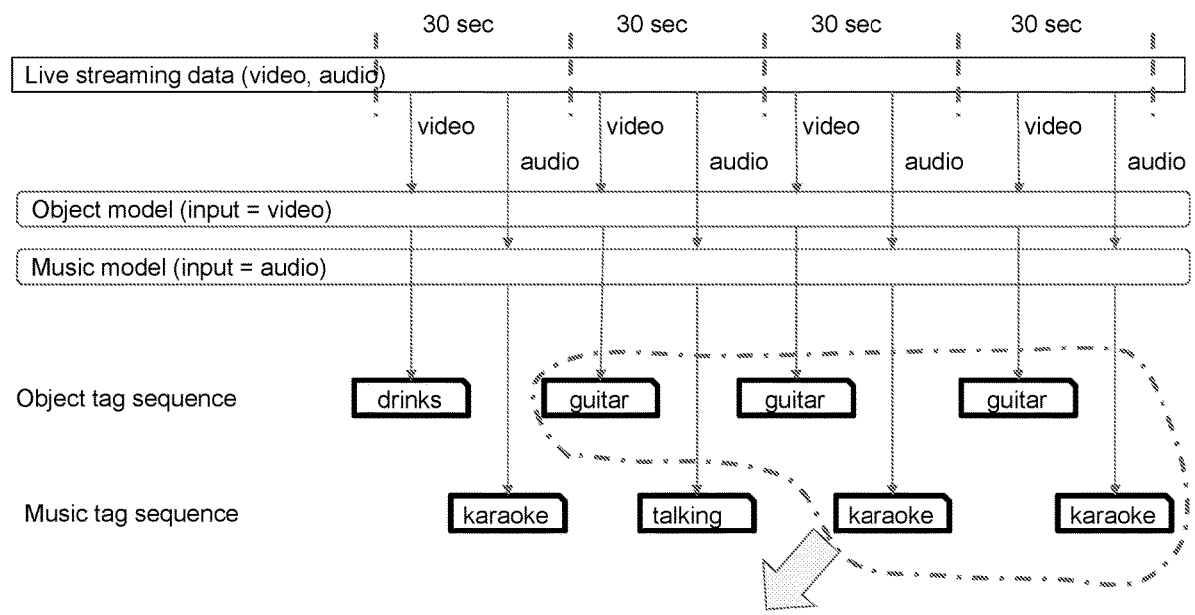
FIG. 4 shows an example of tagging a live streaming data in accordance with some embodiments of the present disclosure.

FIG. 4 shows an example of tagging a live streaming data in accordance with some embodiments of the present disclosure. The tagging process of the live streaming described in FIG. 4 is performed in parallel with provision of the live streaming to viewers. In other words, the tagging process is performed in real time. While the streamer is generating the live streaming and the viewers is viewing the live streaming, the model continuously takes the live streaming as input and outputs the intermediate tags.

As shown in FIG. 4, the live streaming data includes video content and audio content. The live streaming data is input into an object model (object recognizing model) and a music model (music recognizing model). In this embodiment, the object model takes the video content as input, and the music model takes the audio content as input. Every 30 seconds the object model generates an intermediate tag (corresponding to the object tag sequence) and the music model generates an intermediate tag (corresponding to the music tag sequence). Those intermediate tags may be recorded in the generated intermediate tag table 206 in FIG. 2A.

The final tag determining unit 202 then monitors the generated intermediate tags and compares with the final tag criteria stored in the criterion database 208. As shown in FIG. 4, as 3 consecutive "guitar" tags generated by the object model and 2 consecutive "karaoke" tags generated by the music model are detected, the final tag would be determined to be "guitar singing" (which corresponds to the criterion C1 in the criterion database 208 shown in FIG. 2A).

In some embodiments, intermediate tags generated from different models may be generated in a time order or may be generated in parallel.

In some embodiments, intermediate tags generated from more than 2 models may be used to determine the final tag. In that case, a final tag criterion may require an arrangement of intermediate tags from more than 2 models. For example, to determine a final tag to be "guitar singing," a criterion involving 3 models may require an object model to generate 3 "guitar" intermediate tags, require a music model to generate 2 "karaoke" intermediate tags, and require an activity model to generate 2 "playing guitar" intermediate tags. Compared with the above criterion involving only the object model and the music model, the criterion involving 3 models may exclude the scenario wherein a streamer sings with a guitar hung in the background (not being played). The criterion involving 3 models may be more precise in picking the content of a streamer singing while playing a guitar, which corresponds to the final tag "guitar singing." Therefore, involving more models in determining the final tag can deliver a more granular and more precise result in the categorization process.

The criterion for determining a corresponding final tag with intermediate tags may be defined according to the actual practice, purpose or application. AI or machine learning models (such as reinforced learning models) may be utilized to define the required arrangement or combination of the intermediate tags in a criterion. For example, by training a machine learning model with known streaming contents and determined final tags, the model may learn to adjust or optimize the parameters in a final tag criterion. The parameters may include the models to be involved, the number of intermediate tags, or the arrangement of intermediate tags.

In some embodiments, the determined final tags for available live streaming programs would be used for recommending the live streaming programs to users. For example, a recommendation unit (could be implemented in a backend server or a streaming server) may utilize the final tags in the stream database 207 and user tags in a user database (could be implemented in a backend server) to determine or calculate a similarity index between each live streaming program and each user. The similarity index could be used to determine the priority of recommending live streaming programs to a specific user.

Figure 5:
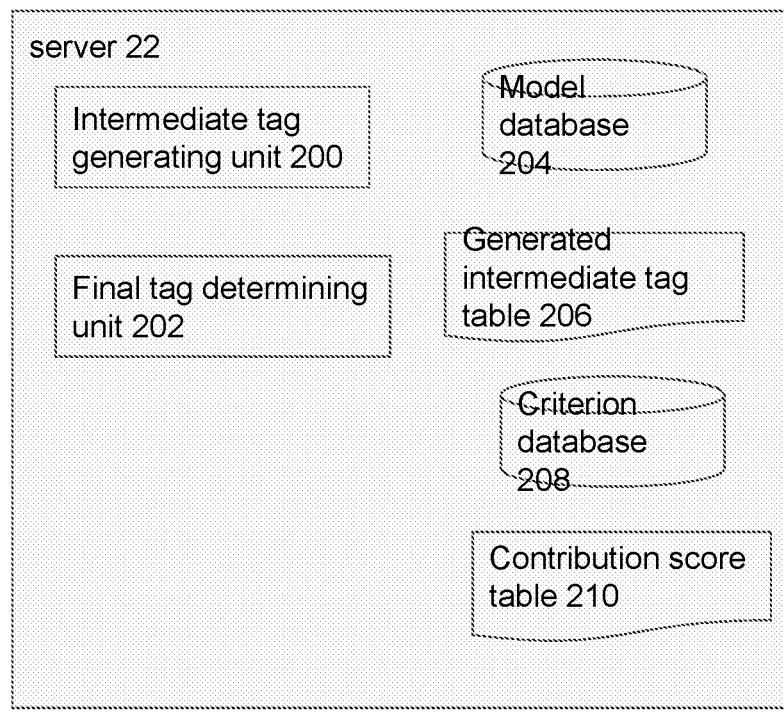
FIG. 5 shows an exemplary block diagram of a server in accordance with some embodiments of the present disclosure.

FIG. 5 shows an exemplary block diagram of a server in accordance with some embodiments of the present disclosure. Compared with the server 20 in FIG. 2, the server 22 in FIG. 5 further comprises a contribution score table 210. In some embodiments, the server 22 may be a portion of or may be the backend server 30 or the streaming server 40 in FIG. 1.

In some embodiments, the contribution score table is configured to determine or define a contribution score of an intermediate tag generated from a machine learning model with respect to a candidate tag (or final tag candidate). For example, a "guitar" intermediate tag generated from the object model is given a contribution score of 5 with respect to the candidate tag "guitar & singing."

Figure 7:
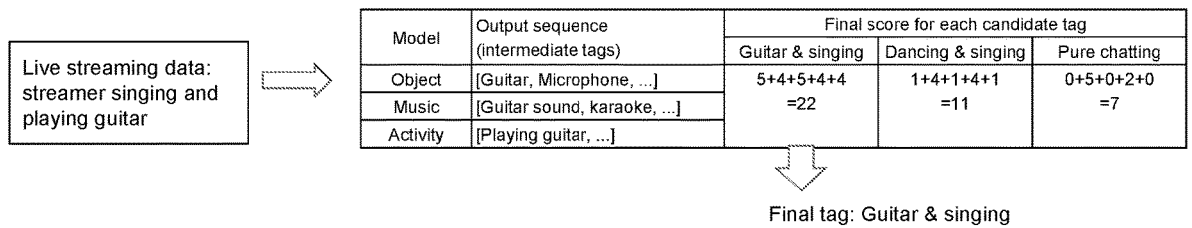
FIG. 7 shows an example of determining a final tag in accordance with some embodiments of the present disclosure.

FIG. 6 shows an exemplary data structure of the contribution score table 210 of FIG. 5. FIG. 7 shows an example of determining a final tag in accordance with some embodiments of the present disclosure.

As shown in FIGS. 6 and 7, the target live streaming data has the content of a streamer singing and playing a guitar. The live streaming data is taken as input into the object model, the music model and the activity model to generate the intermediate tags. The process may be performed by, for example, the intermediate tag generating unit 200. The object model generates the intermediate tag sequence [Guitar, Microphone, . . . ]. The music model generates the intermediate tag sequence [Guitar sound, karaoke, . . . ]. The activity model generates the intermediate tag sequence [Playing guitar, . . . ].

A final score for each candidate tag is calculated based on the intermediate tags generated by those models and the contribution score table 210. The process may be performed by, for example, the final tag determining unit 202. Different embodiments may implement different methods of calculating the final score from the intermediate tags. For example, in some embodiments, a weighted sum of the contribution scores of the intermediate tags with respect to each candidate tag is calculated to deliver the final score for the candidate tag. In some embodiments, the candidate tag with the highest final score will be determined to be the final tag. The process may be performed by, for example, the final tag determining unit 202. In some embodiments, the final score calculation may involve intermediate tags generated within a specific (or predetermined) time period.

In the embodiment shown in FIGS. 6 and 7, equally weighted sums of the contribution scores of the intermediate tags are utilized to calculate the final scores for the candidate tags. The candidate tag "Guitar & singing" has a final score of 22, which is calculated (or contributed) by 5 (from the intermediate tag "Guitar" from the object model)+4 (from the intermediate tag "Microphone" from the object model)+5 (from the intermediate tag "Guitar sound" from the music model)+4 (from the intermediate tag "Karaoke" from the music model)+4 (from the intermediate tag "Playing guitar" from the activity model). With similar calculation logic, the candidate tag "Dancing & singing" has a final score of 11, and the candidate tag "Pure chatting" has a final score of 7.

In this embodiment, the candidate tag ("Guitar & singing") with the highest final score (22) is determined to be the final tag for the live streaming data. This process may be performed by the final tag determining unit 202.

In some embodiments, a frequency of the occurrence of an intermediate tag may be taken into account in calculating the final score for a candidate tag. For example, the contribution score of a specific intermediate tag (generated from a specific model, and with respect to a specific candidate tag) may be defined to increase as the intermediate tag is generated more frequently. For example, a higher weight may be given to an intermediate tag that is generated more frequently. That may prevent some bios or noise factors and deliver a more precise or a more fair final score result.

The contribution score of an intermediate tag with respect to a candidate tag may be defined according to the actual practice, purpose or application. The method of calculating the final score of a candidate tag from the contribution scores of the intermediate tags may be determined according to the actual practice, purpose or application. AI or machine learning models (such as reinforced learning models) may be utilized to define the contribution score or the final score calculation method. For example, by training a machine learning model with known streaming contents and determined final tags, the model may learn to optimize the definition of the contribution score or the final score calculation method.

In some embodiments, the models used to generate the intermediate tags may include an object recognizing model, a music recognizing model, an activity recognizing model, a motion recognizing model, a background recognizing model and/or a topic recognizing model. The generation of intermediate tags may involve an object recognizing process, a music recognizing process, an activity recognizing process, a motion recognizing process, a background recognizing process and/or a topic recognizing process. In some embodiments, an object model also recognizes human body parts, such as hair or face, in a live streaming data.

In some embodiments, a model may only take a portion of the live streaming data as its input. For example, an object recognizing model may take image data from the live streaming data as its input. A music recognizing model may take audio data from the live streaming data as its input. A topic recognizing model may take text or audio data from the live streaming data as its input. In some embodiments, that can save the resource and improve the efficiency in categorizing the live streaming data.

The present disclosure discloses methods and systems for categorizing live streaming programs with multiple models. Therefore a more granular, precise and human-understandable result can be achieved, which may further improve the subsequent recommendation results.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the patent application scope.

LIST OF REFERENCE NUMBERS

1 Communication system
10 User terminal
30 Backend server
40 Streaming server
90 Network
20 Server
22 Server
200 Intermediate tag generating unit
202 Final tag determining unit
204 Model database
206 Generated intermediate tag table
207 Stream database
208 Criterion database
210 Contribution score table
MD1, MD2, MD3 Machine learning model
C1, C2, C3 Criterion
S300, S302, S304, S306 Step
LS1 Stream ID

What is claimed is:

1. A method for tagging a live streaming program, comprising:
generating a first intermediate tag for the live streaming program;
generating a second intermediate tag for the live streaming program;
determining a final tag for the live streaming program according to the first intermediate tag and the second intermediate tag;
determining the first intermediate tag to have been generated consecutively for a first predetermined number of times;
determining the second intermediate tag to have been generated consecutively for a second predetermined number of times,
wherein the consecutive generation of the first intermediate tag for the first predetermined number of times and the consecutive generation of the second intermediate tag for the second predetermined number of times corresponds to the final tag; and determining the generation of the first intermediate tag and the generation of the second intermediate tag to have met a predetermined criterion for determination of the final tag, wherein the predetermined criterion requires a predetermined arrangement of the first intermediate tag and the second intermediate tag within a predetermined period of time, wherein generating the first intermediate tag comprises an object recognizing process, a music recognizing process, an activity recognizing process, a motion recognizing process, a background recognizing process or a topic recognizing process.

2. The method according to claim 1, wherein the generating the first intermediate tag includes inputting data of the live streaming program to a first machine learning model to obtain the first intermediate tag as an output from the first machine learning model, wherein the generating the second intermediate tag includes inputting data of the live streaming program to a second machine learning model to obtain the second intermediate tag as an output from the second machine learning model, wherein the generation of the first intermediate tag and the second intermediate tag is performed concurrently with provision of the live streaming program to users.

3. The method according to claim 1, further comprising:
defining a first contribution score for the first intermediate tag with respect to the final tag;
defining a second contribution score for the second intermediate tag with respect to the final tag,
wherein determining the final tag comprises calculating a weighted sum of the first contribution score and the second contribution score.

4. The method according to claim 3, wherein the first contribution score increases as the first intermediate tag is generated more frequently.

5. The method according to claim 1, further comprising:
generating a plurality of intermediate tags for the live streaming program;
defining a contribution score for each intermediate tag with respect to each one of a plurality of candidate tags;
calculating a final score for each candidate tag according to the contribution score of each intermediate tag with respect to each candidate tag; and
determining the final tag to be the candidate tag with the highest final score.

6. A system for tagging a live streaming program, comprising one or a plurality of processors, wherein the one or plurality of processors execute a machine-readable instruction to perform:
generating, by the one or plurality of processors, a first intermediate tag for the live streaming program;
generating, by the one or plurality of processors, a second intermediate tag for the live streaming program; and
determining, by the one or plurality of processors, a final tag for the live streaming program according to the first intermediate tag and the second intermediate tag;, determining, by the one or plurality of processors, the first intermediate tag to have been generated consecutively for a first predetermined number of times;
determining, by the one or plurality of processors, the second intermediate tag to have been generated consecutively for a second predetermined number of times,
wherein the consecutive generation of the first intermediate tag for the first predetermined number of times and the consecutive generation of the second intermediate tag for the second predetermined number of times corresponds to the final tag; and
determining, by the one or plurality of processors, the generation of the first intermediate tag and the generation of the second intermediate tag to have met a predetermined criterion for determination of the final tag,
wherein the predetermined criterion requires a predetermined arrangement of the first intermediate tag and the second intermediate tag within a predetermined period of time,
wherein generating the first intermediate tag comprises an object recognizing process, a music recognizing process, an activity recognizing process, a motion recognizing process, a background recognizing process or a topic recognizing process.

7. A non-transitory computer-readable medium including a program for tagging a live streaming program, wherein the program causes one or a plurality of computers to execute:
generating a first intermediate tag for the live streaming program;
generating a second intermediate tag for the live streaming program; and
determining a final tag for the live streaming program according to the first intermediate tag and the second intermediate tag;
determining the first intermediate tag to have been generated consecutively for a first predetermined number of times;
determining the second intermediate tag to have been generated consecutively for a second predetermined number of times,
wherein the consecutive generation of the first intermediate tag for the first predetermined number of times and the consecutive generation of the second intermediate tag for the second predetermined number of times corresponds to the final tag; and
determining the generation of the first intermediate tag and the generation of the second intermediate tag to have met a predetermined criterion for determination of the final tag,
wherein the predetermined criterion requires a predetermined arrangement of the first intermediate tag and the second intermediate tag within a predetermined period of time,
wherein generating the first intermediate tag comprises an object recognizing process, a music recognizing process, an activity recognizing process, a motion recognizing process, a background recognizing process or a topic recognizing process.

* * * * *